(12) United States Patent
Chapdelaine et al.

(10) Patent No.: US 10,875,462 B2
(45) Date of Patent: Dec. 29, 2020

(54) TRUNK FOR AN ALL-TERRAIN VEHICLE

(71) Applicant: KIMPEX INC., Drummondville (CA)

(72) Inventors: Benoit Chapdelaine, Sherbrooke (CA);
Pierre-Alain Michaud, Drummondville (CA)

(73) Assignee: KIMPEX INC., Drummondville (CA)

( * ) Notice: Subject to any disclaimer, the term of this patent is extended or adjusted under 35 U.S.C. 154(b) by 132 days.

(21) Appl. No.: 15/982,757

(22) Filed: May 17, 2018

(65) Prior Publication Data

US 2019/0351836 A1    Nov. 21, 2019

(51) Int. Cl.
*B60R 9/06* (2006.01)

(52) U.S. Cl.
CPC .................. *B60R 9/065* (2013.01)

(58) Field of Classification Search
CPC .......... B62K 19/46; B62K 7/04; B60R 9/055; B65D 11/1893
See application file for complete search history.

(56) References Cited

U.S. PATENT DOCUMENTS

| | | | | |
|---|---|---|---|---|
| 3,625,405 A | * | 12/1971 | Kezar | B62J 9/00 224/413 |
| 3,966,072 A | * | 6/1976 | Gonzales | B65D 19/12 220/7 |
| 4,059,207 A | * | 11/1977 | Jackson | A45F 3/50 224/413 |
| 4,340,139 A | * | 7/1982 | Wilcox | A45C 13/00 206/349 |
| 5,040,834 A | * | 8/1991 | Kahl | E05C 3/048 220/315 |
| 5,083,632 A | | 1/1992 | Saito et al. | |
| 5,125,697 A | * | 6/1992 | Kahl | E05C 3/048 220/315 |
| 5,573,132 A | * | 11/1996 | Kanfer | B65D 43/162 220/254.3 |
| 5,573,162 A | * | 11/1996 | Spencer | B62J 9/00 224/401 |
| 5,575,401 A | * | 11/1996 | Trower | A45C 11/20 206/379 |
| 5,718,350 A | * | 2/1998 | Williams | B65D 21/0219 220/326 |
| 5,769,260 A | * | 6/1998 | Killinger | A45C 13/005 220/4.23 |

(Continued)

*Primary Examiner* — Brian D Nash
(74) *Attorney, Agent, or Firm* — Myers Bigel, P.A.

(57) ABSTRACT

The present disclosure concerns a trunk for an all-terrain vehicle comprising a hollow base defining a storage space, one removable lid partially connectable to the hollow base and movable between a closed position in which the storage space is covered, and an opened position for providing access to the storage space, the removable lid being removably connected to the hollow base via a dismantlable hinge comprising a hinge pin selectively connecting a portion of the removable lid with a portion of the hollow base, the dismantlable hinge being dismantlable when said the removable lid is in its opened position, the trunk further comprising a blocking device preventing dismantling of the dismantlable hinge when the removable lid is in its closed position.
The disclosure also concerns a method for removing a removable lid covering a storage space defined by a hollow base of a trunk.

32 Claims, 6 Drawing Sheets

(56) References Cited

U.S. PATENT DOCUMENTS

| | | | | |
|---|---|---|---|---|
| 5,931,336 | A * | 8/1999 | Takeuchi | B60R 7/04 220/836 |
| 6,016,943 | A * | 1/2000 | Johnson | B60R 9/00 224/401 |
| 6,035,800 | A * | 3/2000 | Clifford | B63B 25/002 114/347 |
| 6,145,719 | A * | 11/2000 | Robert | B60R 7/14 224/319 |
| 6,209,941 | B1 | 4/2001 | Cross | |
| 6,332,639 | B1 | 12/2001 | Tanaka et al. | |
| 6,425,510 | B1 * | 7/2002 | King | B60R 9/065 224/401 |
| 6,623,071 | B2 * | 9/2003 | Kawamoto | B62J 1/12 297/195.13 |
| 6,729,516 | B2 * | 5/2004 | Hanagan | B62J 9/20 224/423 |
| 6,776,250 | B2 * | 8/2004 | Kuji | B62J 9/25 180/68.3 |
| 7,004,365 | B2 * | 2/2006 | Ingram | B60R 7/14 220/23.91 |
| 7,128,341 | B1 * | 10/2006 | Dahl | B60R 9/00 280/769 |
| 7,744,260 | B2 | 6/2010 | Yamamoto | |
| 7,861,458 | B2 * | 1/2011 | Apps | A01K 69/10 43/105 |
| 9,114,909 | B2 * | 8/2015 | Wagner | B65D 21/0233 |
| 9,216,787 | B2 | 12/2015 | Duncan et al. | |
| 9,399,434 | B2 * | 7/2016 | Kennedy | B60R 11/06 |
| 9,676,340 | B2 * | 6/2017 | Ankolikar | E05D 15/505 |
| 9,809,270 | B2 | 11/2017 | Olli et al. | |
| 2002/0047257 | A1 * | 4/2002 | Rondeau | B62J 15/00 280/849 |
| 2004/0080186 | A1 | 4/2004 | Crepeau et al. | |
| 2005/0064785 | A1 * | 3/2005 | Lee | A63H 17/26 446/454 |
| 2006/0169608 | A1 * | 8/2006 | Carnevali | G06F 1/1626 206/320 |
| 2011/0156410 | A1 | 6/2011 | Ogawa | |
| 2013/0068813 | A1 | 3/2013 | Choates et al. | |
| 2015/0191210 | A1 * | 7/2015 | Visenzi | E05B 65/52 70/63 |
| 2016/0144761 | A1 * | 5/2016 | Olli | B62K 5/01 296/183.1 |
| 2016/0144922 | A1 * | 5/2016 | Olli | B62D 61/10 180/22 |
| 2016/0167727 | A1 | 6/2016 | Da Deppo et al. | |
| 2017/0174145 | A1 | 6/2017 | Labbe et al. | |

* cited by examiner

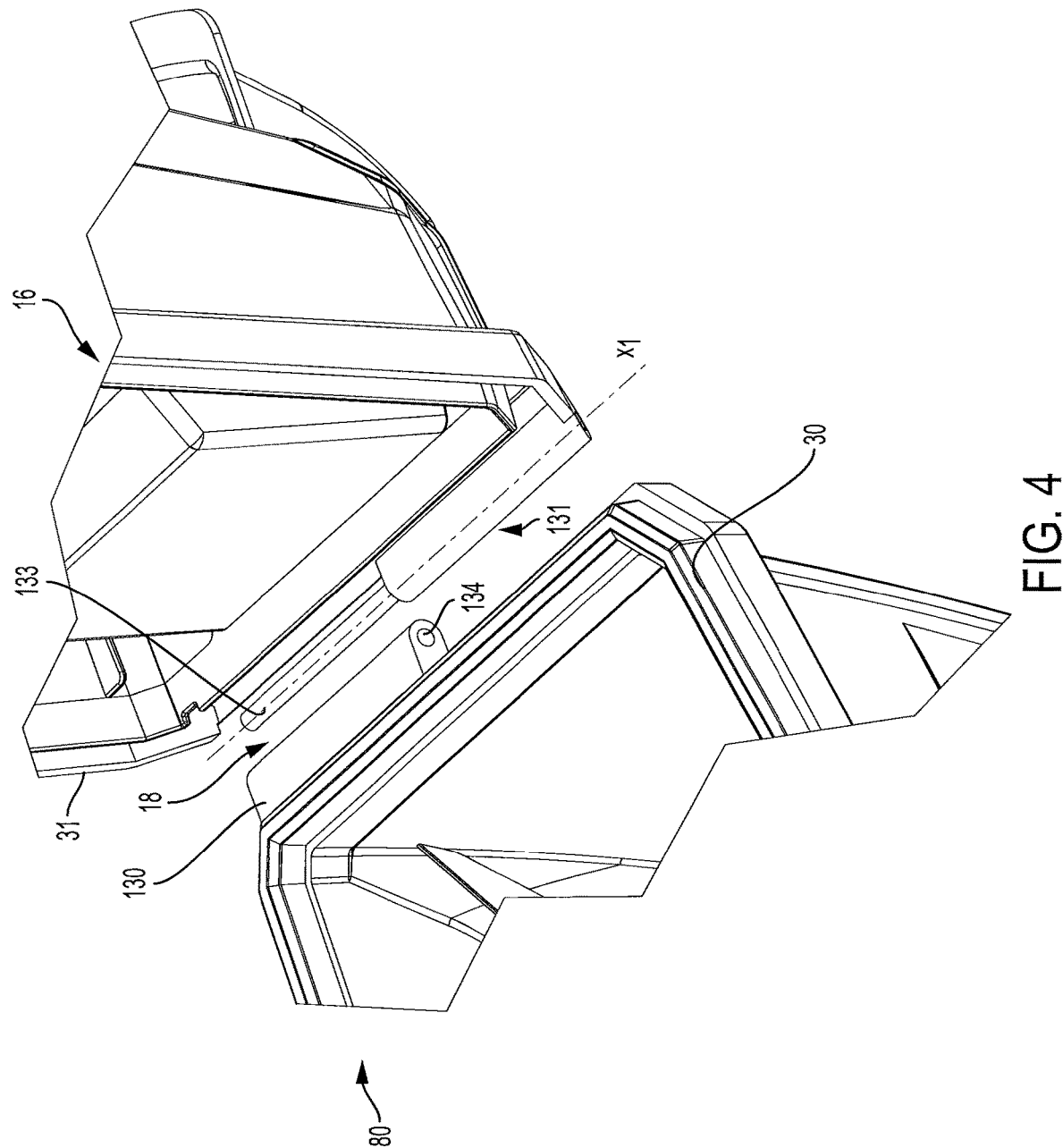

TRUNK FOR AN ALL-TERRAIN VEHICLE

TECHNICAL FIELD OF THE INVENTION

The technical field relates to a trunk that is designed to be mounted on an All-Terrain Vehicle (ATV), also referred to as a UTV (Utility Vehicle) or a ROV (Recreational Off-Highway Vehicle), and more particularly to a trunk including different improvements to ease the use of the trunk and adapt it to different situations.

BACKGROUND

All-terrain vehicles are used for various outdoor activities and tasks, for instance for hunting and fishing, farming activities, transporting cumbersome and/or heavy loads, etc. They are designed to travel over many different terrains. They can be referred to as Utility Vehicles, Recreational Vehicles, four-wheelers, quads, etc. They are typically designed to travel on dirt roads, sand & gravel paths but also in forests and on snow. Snowmobiles can also be considered as ATVs.

ATVs typically have a carrier rack or other similar structure at their rear end, to support a trunk which provides storage space. Trunks may be provided with lids, to protect and securely transport loads (such as tools, camping equipment, luggage, game, etc.). However, lids can be unpractical when transporting bulky or oversized loads. Moreover, the storage space itself is usually not adapted to alternatively transport bulky and/or small items.

In view of the above, there is a need for a trunk for an all-terrain vehicle which overcomes or at least minimize some of the above-discussed drawbacks.

BRIEF SUMMARY OF THE INVENTION

According to a general aspect, a trunk for an all-terrain vehicle is provided. The trunk comprises a hollow base mountable on the all-terrain vehicle and defining at least one storage space. The trunk also comprises at least one removable lid, partially connectable to the hollow base. The removable lid is movable, when connected to the hollow base, between a closed position in which the storage space is at least partially covered, and an opened position for providing access to the storage space. The removable lid is removably connected to the hollow base via a dismantlable hinge that comprises a hinge pin, selectively connecting a portion of the removable lid with a portion of the hollow base. The dismantlable hinge is dismantlable when the at least one removable lid is in its opened position. The trunk further comprises a blocking device that prevents dismantling of the hinge when the removable lid is in its closed position. The trunk can comprise one or more removable lids as described above.

In some embodiments, the dismantlable hinge is at least partially distinct from the hollow base and from said at least one removable lid.

In some other embodiments, the blocking device is hidden in said storage space when said at least one removable lid is in its closed position.

According to another aspect, there is provided a trunk configured to be mounted on an all-terrain vehicle. The trunk comprises at least a hollow base mountable on the all-terrain vehicle and defining at least one storage space. The trunk also comprises at least one removable lid partially connectable to the hollow base. The at least one removable lid is movable, when connected to the hollow base, between a closed position in which the at least one storage space is covered, and an opened position for providing access to said at least one storage space. The trunk also comprises a dismantlable connector for connecting the at least one removable lid to the hollow base. The dismantlable connector is only dismantlable when the at least one removable lid is in its opened position.

According to another aspect, there is provided a method for removing at least one removable lid covering a storage space defined by a hollow base of a trunk. The trunk is configured to be mounted on an all-terrain vehicle. The at least one removable lid is connected to the hollow base via a dismantlable hinge. The at least one removable lid is movable, when connected to the hollow base, between a closed position in which said storage space is covered, and an opened position for providing access to said storage space. The method comprises opening the at least one removable lid. The method further comprises manually dismantling the dismantlable hinge without using any tools and removing the at least one removable lid.

In this specification, it should be understood that the term "all-terrain vehicle" is not limited to the above-mentioned ATV, UTV or ROV, but also includes other types of vehicles, such as snowmobiles.

BRIEF DESCRIPTION OF THE DRAWINGS

FIG. 4 is an enlarged view of a portion of the trunk, showing another possible embodiment of a dismantlable hinge.

DETAILED DESCRIPTION

Figure 1:
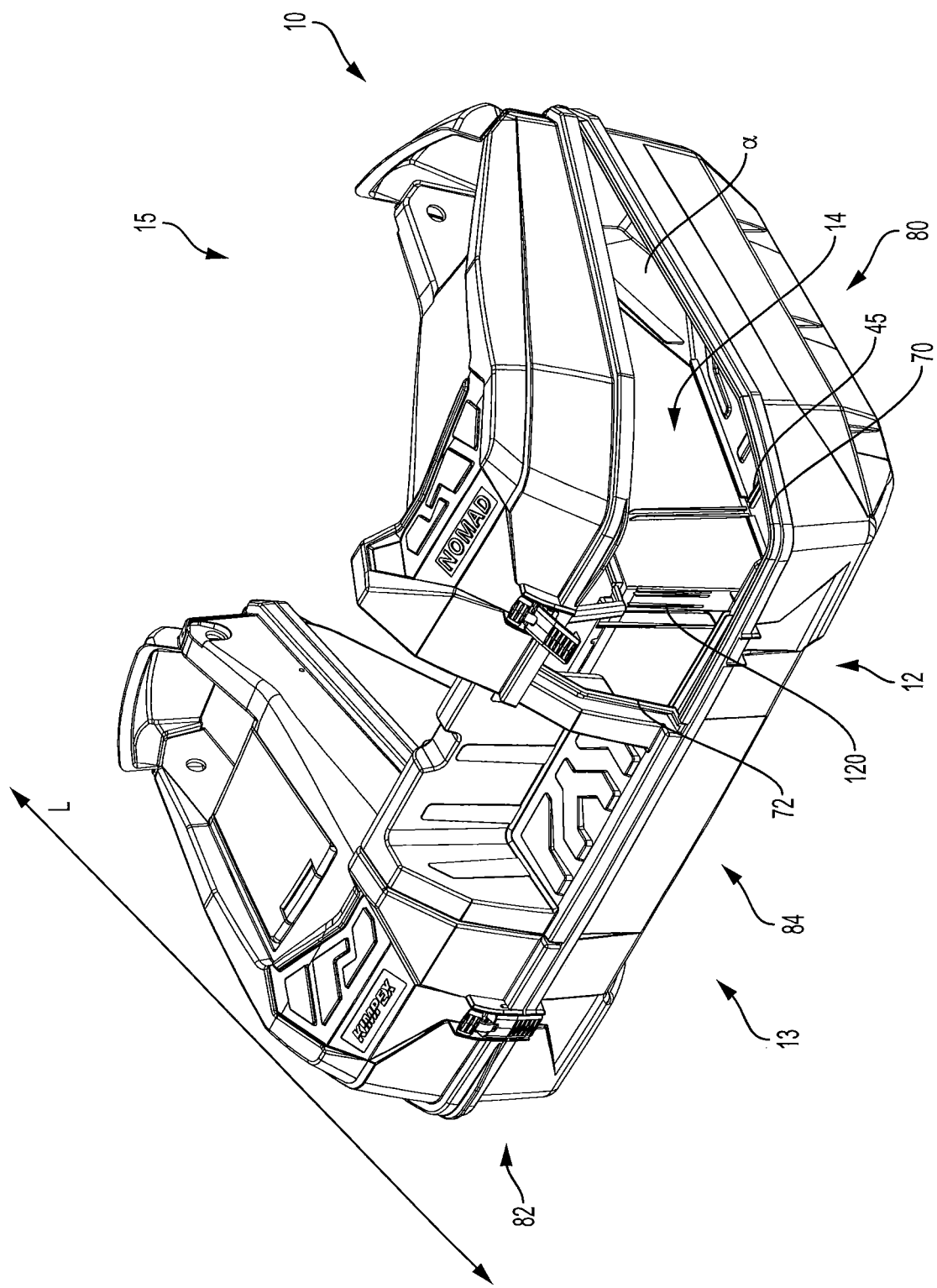
FIG. 1 is a perspective view of a trunk in accordance with an embodiment, the trunk having a first removable lid in a partially opened position.

In the following description, the same numerical references refer to similar elements. Furthermore, for the sake of simplicity and clarity, namely not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward" "left", "right" and the like should, unless otherwise indicated, be taken in the context of the figures and correspond to the position and orientation of the trunk and corresponding parts when being mounted on a vehicle.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples. It is to be understood that the details set forth herein do not construe a limitation to an application of the invention.

Furthermore, it is to be understood that the invention can be carried out or practiced in various ways and that the invention can be implemented in embodiments other than the ones outlined in the description above. It is to be understood that the terms "including", "comprising" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not to be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Figure 2:
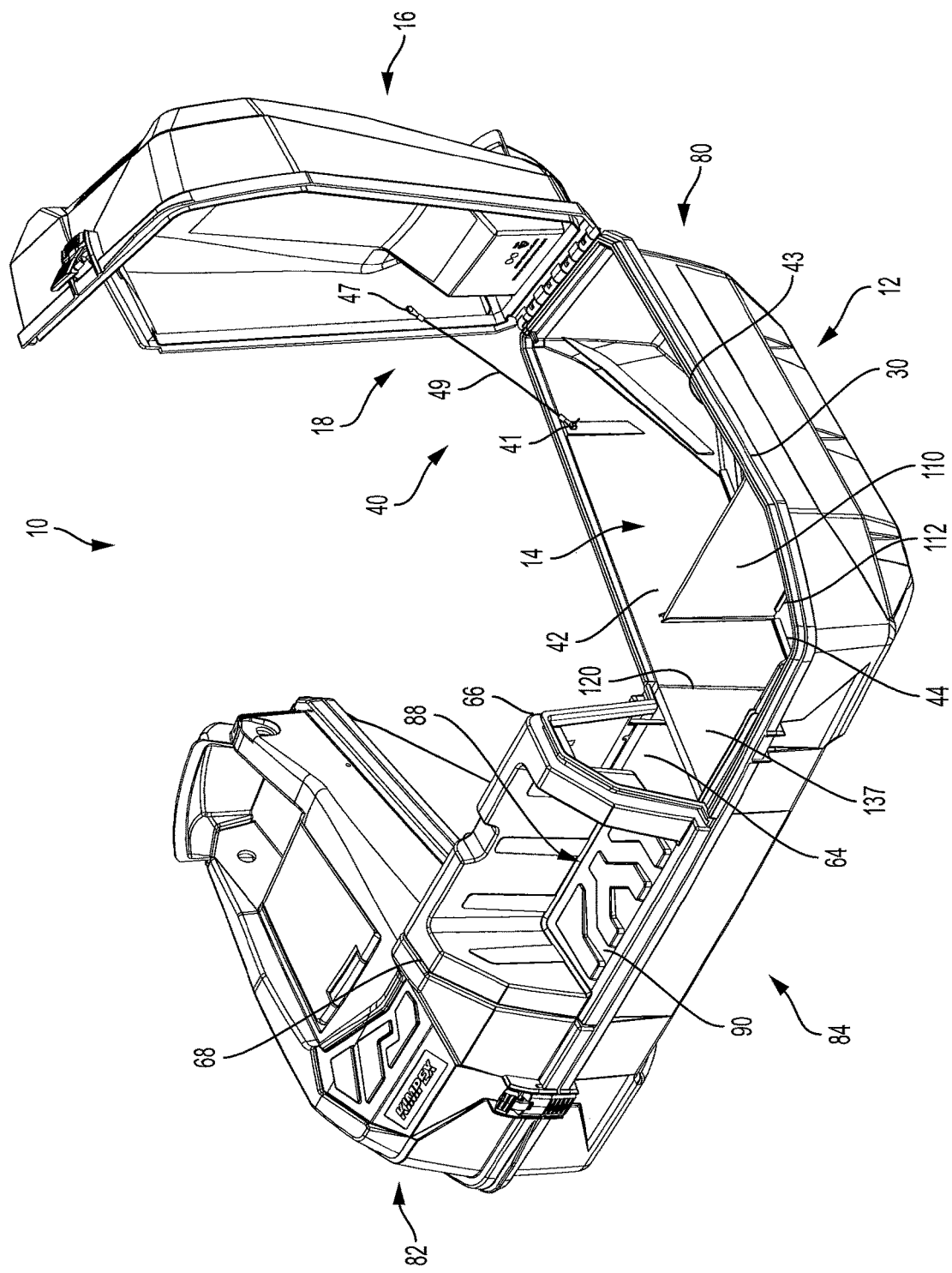
FIG. 2 is a perspective view of the trunk of FIG. 1, the first removable lid being in a fully opened position.

Referring now to the drawings, and more particularly to FIGS. 1 and 2, there is shown a trunk 10 that is configured to be mounted to an all-terrain vehicle (not represented), for instance on a rear carrier rack.

The trunk 10 comprises a hollow base 12 that is configured to be mounted on the all-terrain vehicle and that defines at least partially a storage space 14. In this embodiment, the hollow base 12 is substantially U-shaped and has first and second lateral portions 80, 82 (which may also be referred as left and right portions 80, 82) disposed on each side of a central portion 84. The central portion 84 is arranged between the first and second lateral portions 80, 82. According to this embodiment, the storage space 14 thus comprises first and second lateral storage spaces 81, 83 defined respectively by the first and second lateral portions 80, 82 of the hollow base 12. Of course, the hollow base may take other shapes and configurations, and can be made of a single molded part or several assembled parts or components.

Still referring to FIGS. 1 and 2, the lateral and central portions 80, 82, 84 of the hollow base 12 are arranged such that, when the trunk 10 is mounted on the rear end of the vehicle, a driver being seated on the vehicle, the central portion 84 is located behind the driver, whereas the first and second lateral portions 80, 82 are located on each side of the driver. In other words, the trunk 10 according to the present disclosure is arranged so as to partially surround a seat of the all-terrain vehicle. In some other embodiments of vehicle, the trunk 10 is configured to partially surround a passenger seated behind the driver of the vehicle. In these embodiments, the central portion 84 of the trunk 10 is located behind the passenger seated behind the driver, whereas the first and second lateral portions 80, 82 of the trunk are located on each side of the passenger. The terms "front", "back" and "rear" should be understood in the present description relative to the usual moving direction of the vehicle on which the trunk 10 is to be mounted. The trunk 10 comprises a rear end 13, the central portion 84 defining at least partially the rear end 13, and an opposed front end 15, the front ends of the first and second lateral portions 80, 82 defining at least partially the front end 15 of the trunk 10. A longitudinal direction "L", as illustrated on FIG. 1, extends from the front to the rear end of the trunk 10.

Still referring to FIGS. 1 and 2, the trunk 10 further comprises at least one removable lid. In the embodiment illustrated, the trunk includes first and second removable lids 16, 86, each partially connectable to the hollow base 12. The first removable lid 16 is partially connected to the first lateral portion 80 of the hollow base 12 and is movable, when the first removable lid 16 is connected to the first lateral portion 80 of the hollow base 12, between a closed position in which it partially covers the storage space 14. More particularly, the removable lid 16 covers the first lateral storage space 81. In the embodiment illustrated, the first removable lid 16 is substantially hollow, so that the storage space 14 is also partially defined by the first removable lid 16 when in the closed position. The structure and shape of the second removable lid 86 being similar to the first removable lid 16, it should be understood that, in the embodiment illustrated on FIGS. 1 and 2, the storage space 14 is defined by the hollow base 12 and by the first and second removable lids 16, 86 when in the closed position. When in an opened position, the first removable lid 16 provides access to the first lateral storage space 81 of the hollow base 12. The first removable lid 16 is thus partially connected to a front end of the first lateral portion 80 so that, when in its opened position, the first lateral storage space 81 can be accessed from the rear end 13 of the trunk 10.

Still referring to FIGS. 1 and 2, but also to FIGS. 3A to 3D and to FIG. 4, the trunk 10 comprises a first dismantlable hinge or connector 18 that removably connects the first removable lid 16 to the first lateral portion 80 of the hollow base 12. Advantageously, the hinge/connector 18 can be dismantled without requiring any tools, by hands only, and it only dismantlable when the lid is opened. This allows ATV users to remove the lids completely if needed, for example when loading an oversized load. This lid system is very practical since no tools, such as screwdrivers and the like, are required to remove the lid. The lid system is secure, since when closed, the lid cannot be dismantled, as will be explained in more detail below.

As best shown in FIG. 2, the first lateral portion 80 of the hollow base 12 has an upper edge 30 and the first removable lid 16 has a lower edge 31. The edges 30, 31 engage with one another when the lid is closed, thereby closing the first lateral storage space 81.

In the embodiment shown in FIGS. 3A to 3D, the first dismantlable hinge or connector 18 comprises a hinge pin 20 that is configured to selectively connect the first lateral portion 80 and the first removable lid 16. The hinge pin 20 defines a first axis X1 and is received, when the first removable lid 16 is partially connected to the first lateral portion 80 at the front end of the first lateral portion 80, in knuckles 42, 44 protruding respectively from the lower edge 31 of the first removable lid 16 and from the upper edge 30 of the first lateral portion 80 of the hollow base 12. In the shown embodiment, the knuckles 42, 44 have a substantially cylindrical body each having a through opening extending along the first axis X1 and dimensioned to removably receive the hinge pin 20.

Figure 3A:
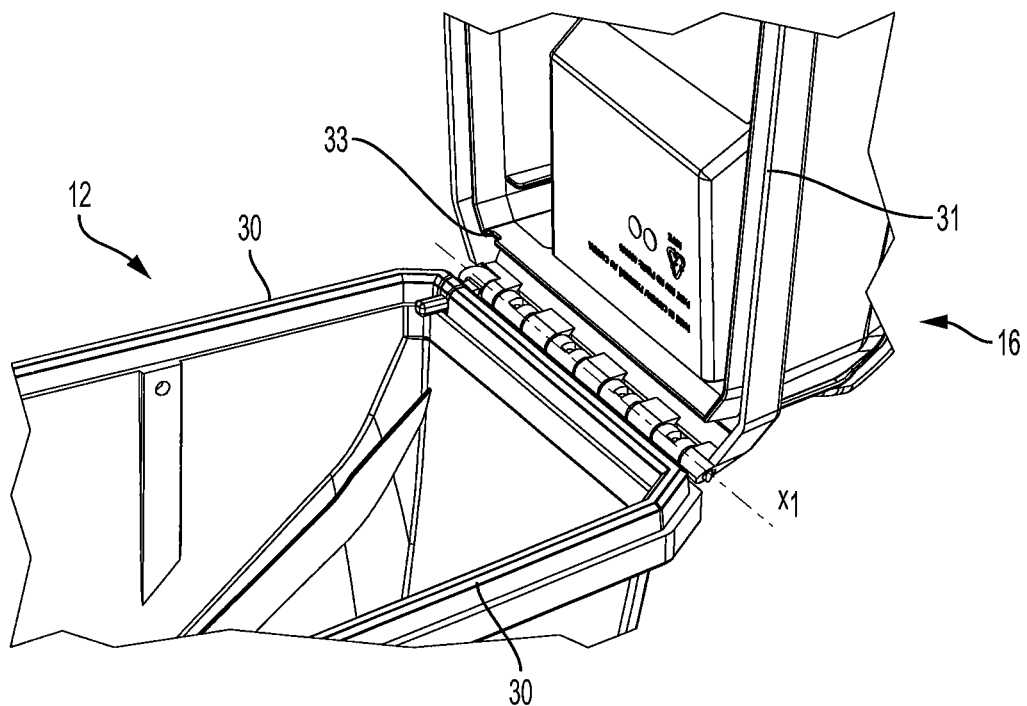
FIG. 3A to 3D are enlarged views of a portion of the trunk of FIGS. 1 and 2, illustrating successive steps for dismantling the dismantlable hinge.
Figure 3B:
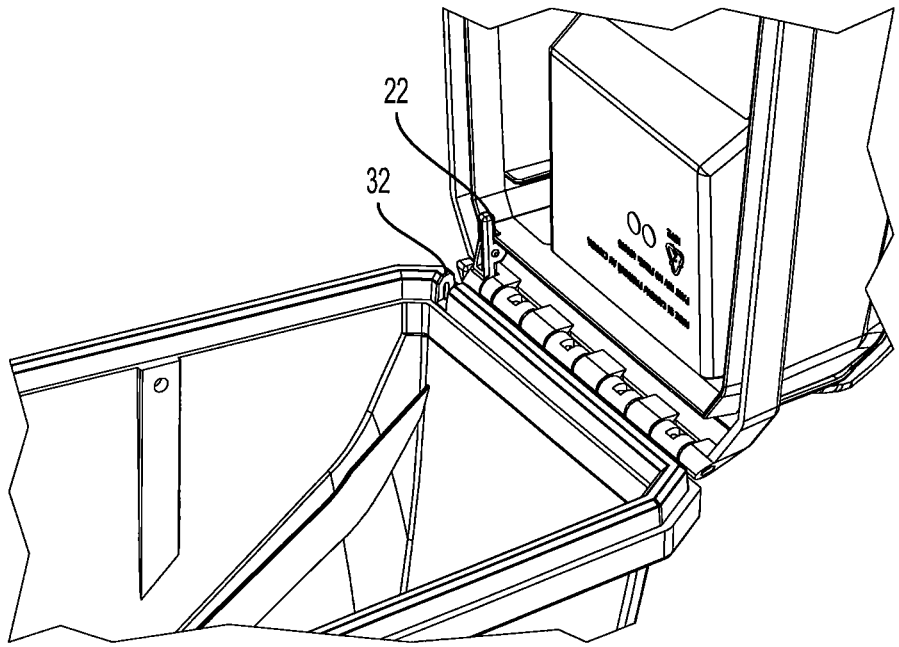
Figure 3C:
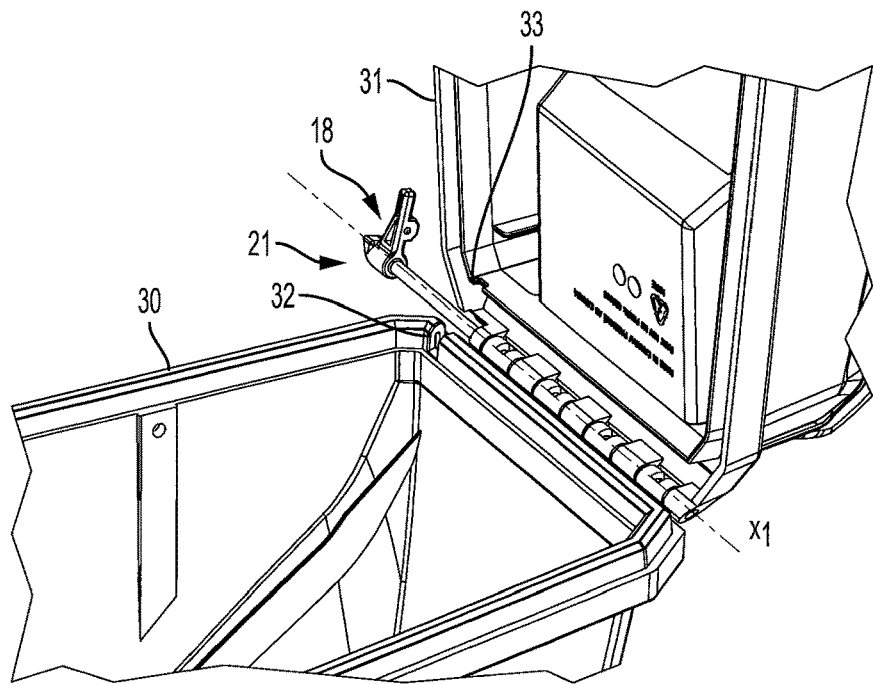
Figure 3D:
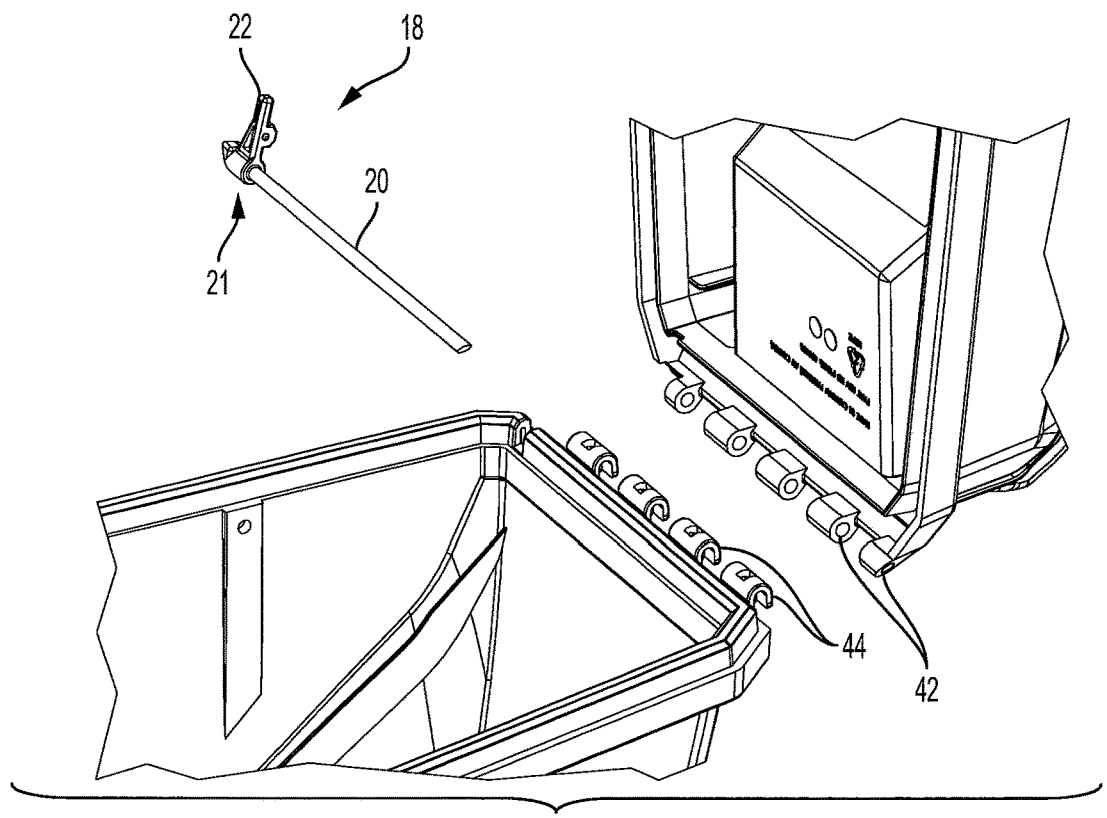

As shown in FIGS. 3C and 3D, the hinge pin 20 can be removed from the knuckles 42, 44 to fully disconnect the first removable lid 16 from the first lateral portion 80 of the hollow base 12. In other words, the first removable lid 16 can be fully and easily removed from the hollow base 12, for the user to have a greater first lateral storage space 81 and an easier access to it.

As shown in FIGS. 3A and 3B, the upper edge 30 of the first lateral portion 80 and the lower edge 31 of the first removable lid 16 both have a slot 32, 33 therein and the dismantlable hinge 18 has a blocking device 22 extending from a first end 21 of the hinge pin 20 in a transverse direction relative to the first axis X1. The blocking device 22 is dimensioned to be received in the slots 32, 33 so as not to hinder the closing of the first removable lid 16. The blocking device 22 is thus configured so that, when the first removable lid 16 is in its closed position, the hinge pin 20 cannot be removed from the knuckles 42, 44: indeed, the blocking device 22 that is received in the slots 32, 33 is dimensioned so that it abuts against the lower edge 31 of the first removable lid 16 and against the upper edge 30 of the first lateral portion 80 when the hinge pin 20 is axially displaced.

The dismantlable hinge or connector 18 is thus configured to prevent any dismantling of the hinge pin 20 when the first removable lid 16 is in its closed position. As a result, it is not possible to fully remove the first removable lid 16 when the first removable lid 16 is in its closed position. In other words, the dismantlable hinge or connector 18 is only dismantlable when the first removable lid 16 is at least partially in its opened position. When closed and locked, the lid cannot be dismantled without tampering the trunk, discouraging possible thefts.

In its closed position, the first removable lid 16 is arranged so that its lower edge 31 is substantially parallel to the upper edge 30 of the first lateral portion 80. When the first removable lid 16 is in its opened position, an angle α is formed between the lower edge 31 of the first removable lid 16 and the upper edge 30 of the first lateral portion 80.

The angle α formed between the lower edge 31 and the upper edge 30 should be greater than a predetermined threshold for the hinge pin 20 to be dismantled. It is understood that the value of the threshold depends, in the shown embodiment, on the dimensions of the blocking device 22 and on the dimensions of the slots 32, 33 formed in the upper and lower edges 30, 31. When the angle α is equal to or greater than the predetermined threshold, as shown in FIGS. 3A, 3B and 3C, the dismantlable hinge or connector 18 can be dismantled, the hinge pin 20 being axially displaced to be removed from the knuckles 42, 44.

It is understood that, when the first removable lid 16 is in its closed position, the blocking device 22 is not reachable from the outside of the trunk 10. In other words, when the first removable lid 16 is in its closed position, the blocking device 22 is hidden in the storage space 14 defined by the hollow base 12, and more particularly is hidden in the first lateral storage space 81.

FIG. 4 illustrates another possible embodiment of the dismantlable hinge or connector 18. In this example, the dismantlable hinge or connector 18 is composed of a first portion 130 of the upper edge 30 of the first lateral portion 80 of the hollow base 12 and of a second portion 131 of the lower edge 31 of the first removable lid 16. For instance, the first and second portions 130, 131 can be molded respectively on the first lateral portion 80 and on the first removable lid 16.

The second portion 131 comprises a hinge pin 133 defining a first axis X1 and the first portion 130 comprises an opening 134 that is dimensioned to receive at least partially the hinge pin 133. The first and second portions 130, 131 are thus configured to cooperate with each other to connect the first lateral portion 80 of the hollow base 12 and the first removable lid 16. Moreover, the first and second portions 130, 131 are configured so that, when the first removable lid 16 is in its opened position, as represented in FIG. 4, the hinge pin 133 can be axially displaced to be removed from the opening 134 of the first portion 130, in order to dismantle the dismantlable hinge or connector 18 and to fully separate the first removable lid 16 from the hollow base 12.

When the first removable lid 16 is in its closed position, its lower edge 31 is engaged with the upper edge 30 of the first lateral portion 80, so that the hinge pin 133 of the second portion 131 cannot be axially displaced. In other words, the upper and lower edges 30, 31 form together a blocking device that prevents dismantling of the dismantlable hinge or connector 18. It is thus understood that the prevention of the dismantling of the dismantlable hinge or connector 18 does not necessarily require an additional element, but can be carried out by the cooperation of the first removable lid 16 and the hollow base 12.

It is also understood that the selective connection of the first removable lid 16 and of the hollow base 12 doesn't necessarily require an additional element, but can be, as in this second embodiment of the dismantlable hinge or connector 18, carried out by portions of the first removable lid 16 and of the hollow base 12. As can be appreciated, either embodiments of the dismantlable hinge allow a user to disconnect the lid from the base without having to use any tools, and yet dismantling of the lid from the base is prevented when the lid is closed.

Now referring back to FIG. 2, the dismantlable hinge/connector 18 further comprises a dismantlable opening limiting device 40 that is configured to retain the first removable lid 16 when in its opened position.

In the shown embodiment, the dismantlable opening limiting device 40 comprises a first end 41 secured to an inside face of the first lateral portion 80 of the hollow base 12 and a second end 47 secured to an inside face of the first removable lid 16; the dismantlable opening limiting device 40 further comprises a body 49 extending between the first and second ends 41, 47 so as selectively connect the first removable lid 16 with the hollow base 12.

The dismantlable opening limiting device 40 is configured so that the angle α that is formed between the lower edge 31 of the first removable lid 16 and the upper edge 30 of the first lateral portion 80 does not exceed a predetermined limit when the first removable lid 16 is in its opened position. Thus, the dismantlable opening limiting device 40 prevents the first removable lid 16 from an excessive opening that could break the dismantlable hinge/connector 18.

Moreover, the rigidity of the body 49 of the dismantlable opening limiting device 40 could be adapted so that the dismantlable opening limiting device 40 would be configured so that it would further prevent any unintentional closing of the first removable lid 16 when in its opened position. The user could thus easily access the first lateral storage space 81. Moreover, the dismantlable opening limiting device 40 can be dismantled from the first removable lid 16 and/or from the first lateral portion 80 of the hollow base 12, allowing the first removable lid 16 to be completely disconnected from the hollow base 14. The first and second ends 41, 47 being secured to the inside faces of the hollow base 14 and of the first removable lid 16, the dismantlable opening limiting device 40 is also dismantlable from the trunk 10 only when the first removable lid 16 is at least partially in its opened position.

Referring to FIGS. 1 and 2, the rearmost ends of the first and second lateral portions 80, 82 can communicate via the central portion 84 of the trunk 10. The trunk 10 may include a first wall 66 and a second wall 68, that do not extend into the lid, thus defining a first opening 64 and a second opening (hidden in FIG. 2), allowing users to store long objects transversally across the rear end of the trunk. In this embodiment, the first and second walls 66, 68 extend substantially vertically in a plane substantially parallel to the longitudinal direction L of the trunk 10. The walls 66, 68 are removable, so as to provide a clear access between the lateral portions 83, 82, via the central portion 84. It should be understood that the first and second openings 64 can either be formed in the first and second wall 66, 68, for instance in an upper portion of the first and second wall 66, 68 so that they have a closed border, or can be defined by first and second walls 66, 68 that would only be formed in a lower portion of the hollow base 12, thus being only limited by a top border of the first and second walls 66, 68.

As best shown in FIG. 2, the central portion 84 preferably includes a back wall 88, having an outer face that defines a substantially horizontal surface when the trunk 10 is mounted on the vehicle. The terms "outer" side or "outside" are used with reference to the storage space 14. The central portion 84 of the hollow base 12 and its back wall 88 are configured to receive an item, such as a lunch box, a gasoline tank or any other element sized to fit on the central recess formed between the lateral sides of the trunk. The trunk 10 may include holding means (not represented), such as a rope, a strap, elastic bands or any other suitable devices, to hold an item placed on the back wall of the central portion 84.

The outer face of the back wall 88 preferably includes drainage channels 90 that are configured to drain water that would otherwise accumulate of the horizontal surface of the back wall 88. The drainage channels 90 may be slopes and/or formed grooves. In addition, the trunk preferably includes drainage grooves or gutters, to allow fluid to slide along the lid. It is further to be noted that the back wall 88 can easily and toollessly be removed from the trunk 10 so as to provide a greater storage space.

Still referring to FIGS. 1 and 2, the lower edge 31 of the first removable lip 16 and the upper edge 30 of the first lateral portion 80 of the hollow base 12 are sized and configured so that they are engaged with each other when the first removable lid 16 is in its closed position, and prevent any material or fluid to enter the first lateral storage space 81. The hollow base 12 further comprises a peripheral edge 70 that is partially defined by the upper edge 30 of the first lateral portion 80. As best shown in FIG. 1, the peripheral edge 70 comprises at least a drainage groove 72 that is configured to prevent water from draining from the first and second removable lids 16, 86 inside the storage space 14 when the first and second removable lids 16, 86 are in their closed position. In the illustrated embodiment, the drainage grooves 72 each comprise a protruding border extending substantially vertically between the central portion 84 and the first lateral portion 80 and dimensioned to cooperate with the first and second removable lids 16, 86 when in their closed position.

In the shown embodiment, the hollow base 12 has first and second inner walls 42, 43 and the trunk 10 further comprises a removable space divider 110 that is configured to be removably mounted to the first and second inner walls 42, 43. The removable space divider 110 thus allows a user to reconfigure the storage space 14, in particular, in the shown embodiment, to reconfigure the first lateral storage space 81 and to define first and second space divisions 91, 92 that are arranged on each side of the removable space divider 110. Thus, the storage space 14 of the trunk 10 can easily be modified so as to adapt it to the items that the user wants to store.

The removable space divider 110 comprises a lower portion 112 cooperating with a groove 45 that is formed on a bottom surface 44 of the hollow base 12, so as to prevent water from flowing from the first 91 to the second 92 space divisions. Items can thus separately be stored in the storage space 14 without being in contact with each other.

In the embodiment shown, and as can be seen in particular on FIG. 2, the hollow base 12 further comprises a separation groove 120 that is arranged between the central portion 84 and the first lateral portion 80. The separation groove 120 is configured to receive a peripheral edge of a storage space splitter 137, to prevent water from flowing between the central portion 84 and the first lateral portion 80. It is further understood that the storage space splitter 137 may be arranged and dimensioned so as to prevent water from flowing into the central portion 84, under the back wall 88, from the outside of the trunk 10, when the first removable lid 16 is in its opened position. A similar separation groove can be provided between the central portion 84 and the second lateral portion 82.

It should be understood that in the shown embodiment, the second removable lid 86 cooperates with the second lateral portion 82 of the hollow base 12 in a similar manner to the one described above relative to the cooperation between the first removable lid 16 and the first lateral portion 80 of the hollow base 12. In other words, the second removable lid 86 is also removably connected to the hollow base 12 via a dismantlable hinge or connector, the dismantlable hinge or connector being dismantlable only when the second removable lid 86 is in its opened position.

The trunk 10 further comprises locking mechanisms 50 to lock each of the first and second removable lids 16, 86 in their closed position respectively to the first and second lateral portions 80, 82 of the hollow base 12.

The locking mechanism 50 will be described with regard to the first removable lid 16, but it should be understood that the structure is similar for the locking mechanism cooperating with the second removable lid 86.

Figure 5B:
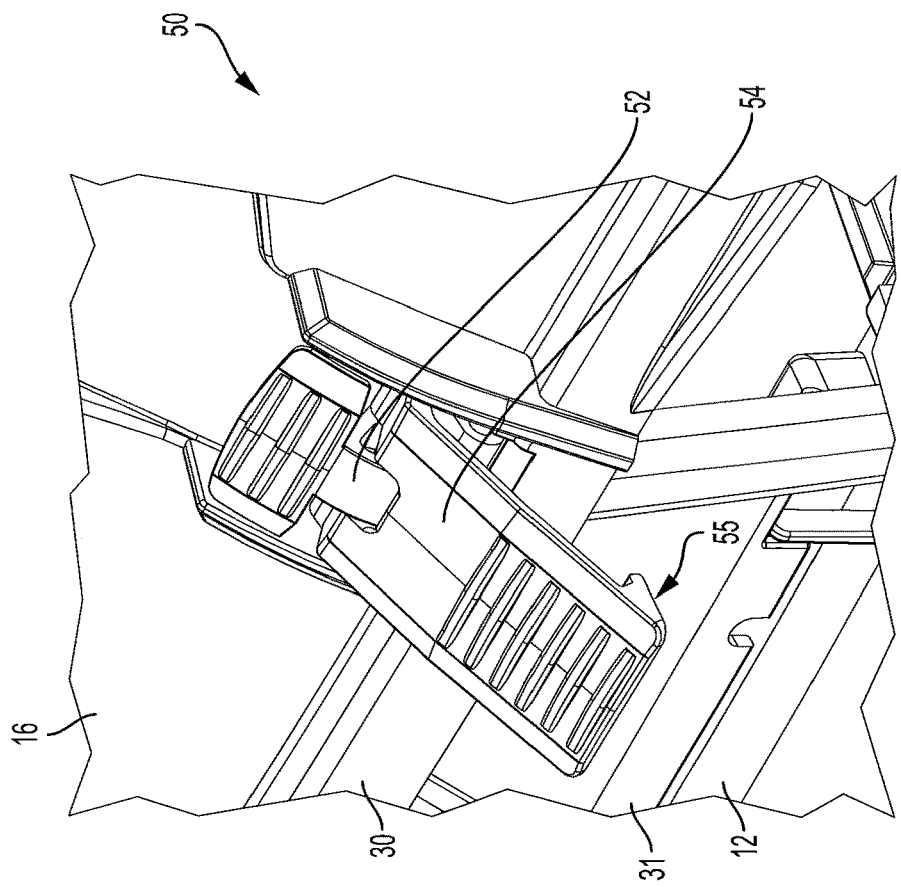
FIGS. 5A and 5B are enlarged views of the rear portion of the trunk, showing a locking mechanism, respectively in closed and opened positions.
Figure 5A:
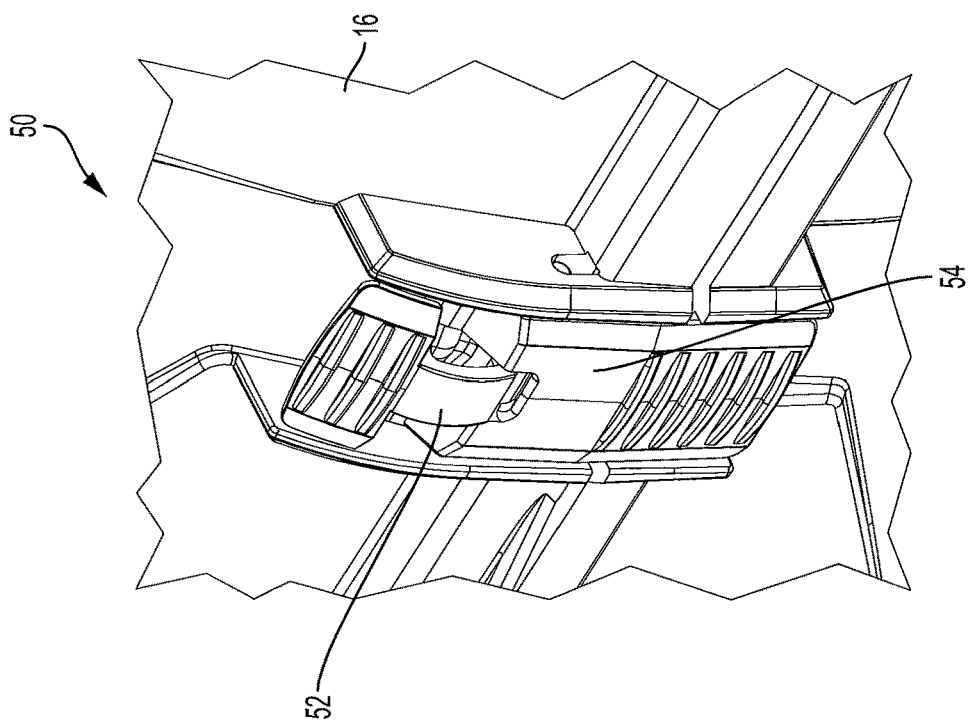

As represented in FIGS. 5A and 5B, the locking mechanism 50 comprises a latch receiving opening 52 and a closing plate 54 pivotably connected around a substantially horizontal axis to the first removable lid 16. The closing plate 54 has a bottom end 55 and the closing plate 54 is configured to take a closing position in which it cooperates with the hollow base 12 when the first removable lid 16 is in its closed position. When the bottom end of the closing plate 54 cooperates with the hollow base 12, for instance via a portion of the bottom end being secured to the upper edge 30 of the hollow base 12, the closing plate 54 extends substantially vertically as represented in FIG. 5A and a latch can be introduced into the latch receiving opening 52 so as to lock the first removable lid 16 in its closed position. In other words, it is understood that in the shown embodiment, when the latch is introduced and locked in the latch receiving opening 52, the bottom end of the closing plate 54 cooperating with the upper edge 30 of the hollow base 12 and the closing plate 54 being in the closing position, the first removable lid 16 cannot be moved in its opened position.

The closing plate 54 is further movable to an opening position in which its bottom end does not cooperate with the hollow base 12, so as to allow the opening of the first removable lid 16. The closing plate 54 is moved to its opening position by pivoting with regard to the first removable lid 16. The locking mechanism 50 is further designed so that, when the closing plate 54 is in its opening position, as represented in FIG. 5B, the closing plate 54 is prevented from automatically pivoting back to its closing position, as represented in FIG. 5A. In some embodiments, the pivoting of the closing plate 54 when in its opening position is prevented by a frictional device, such as a washer or any other adapted means, arranged on the closing plate 54. An adapted blocking device, such as a shank or any other properly dimensioned tool, could also be introduced in the portion of the latch receiving opening 52 extending below the closing plate 54 when the closing plate 54 is in the opening position to prevent the pivoting of the closing plate 54.

It is thus understood that the locking mechanism 50 prevents the latch from being snapped between the first removable lid 16 and the hollow base 12 when the first removable lid 16 is moved from its opened position to its closed position.

It is clear from the above description that the removal of the first removable lid 16 firstly comprises, when the first removable lid 16 is in its closed position, the locking mechanism 50 being locked, the unlocking of the locking mechanism 50. The unlocking of the locking mechanism 50 comprises, in particular, the pivoting of the closing plate 54 with regard to the first removable lid 16.

Then the first removable lid 16 is pivoted with regard to the hollow base 12, so as to be opened.

Once the first removable lid 16 has been opened enough so that the angle α formed between the lower edge 31 and the upper edge 30 is greater than the above mentioned predetermined threshold, the dismantlable hinge or connector 18 is manually dismantled, i.e. without using any tools.

Prior to or after the dismantling of the dismantlable hinge or connector 18, the dismantlable opening limiting device 40 is removed, by disconnecting the first end 41 from the inside face of the hollow base 14 and/or by disconnecting the second end 47 from the inside face of the first removable lid 16.

Once the dismantlable hinge or connector 18 has been manually dismantled, so that, referring to FIGS. 3A to 3D, the hinge pin 20 has been removed, the first removable lid 16 is removed.

It is thus understood that a user can easily and quickly adapt the trunk 10 of the present disclosure to his/her needs, by being provided with a broader storage space, by toollessly dismantling the first removable lid 16 and the opening limiting device 40. As mentioned above, the user can also easily and toollessly remove the back wall 88 of the central portion 84 so as to be provided with a greater storage space. The user can also easily and quickly, still toollessly, going back to a configuration in which the first removable lid 16 can be set in its closed configuration, so as to safely store items in the trunk 10. To do so, he/she will perform the above described steps in reverse order.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A trunk for an all-terrain vehicle, the trunk comprising:
a hollow base mountable on the all-terrain vehicle and defining at least one storage space;
at least one removable lid partially connectable to the hollow base, said at least one removable lid being movable, when connected to the hollow base, between a closed position in which said at least one storage space is covered, and an opened position for providing access to said at least one storage space, said at least one removable lid being removably connected to the hollow base via a dismantlable hinge comprising a hinge pin selectively connecting a portion of said at least one removable lid with a portion of the hollow base, the dismantlable hinge being at least partially distinct from the hollow base and from said at least one removable lid and being dismantlable when said at least one removable lid is in its opened position;
the trunk further comprising a blocking device preventing dismantling of the dismantlable hinge when said at least one removable lid is in its closed position, the blocking device being hidden in said storage space when said at least one removable lid is in its closed position.

2. A trunk according to claim 1, wherein the hollow base comprises an upper edge and said at least one removable lid comprises a lower edge engageable with the upper edge of the hollow base, wherein at least one of said upper and lower edges has a slot, the blocking device being partially received in said slot when said at least one removable lid is in its closed position, and wherein the dismantlable hinge further comprises a dismantlable opening limiting device to retain the removable lid when in the opened position, the dismantlable opening limiting device selectively connecting said at least one removable lid with the hollow base, wherein the dismantlable opening limiting device is dismantlable only when said at least one removable lid is in its opened position.

3. A trunk according to claim 1, wherein the hinge pin defines a first axis and has a first end, the blocking device being a portion of the dismantlable hinge extending from the first end in a transverse direction relative to the first axis.

4. A trunk according to claim 1, wherein the hollow base comprises first and second inner walls and the trunk further comprises at least one removable space divider removably mounted to said first and second inner walls, allowing to reconfigure said storage space and to define first and second space divisions, and wherein the hollow base has a bottom surface comprising a groove, the removable space divider having a lower portion cooperating with the groove of the bottom surface.

5. A trunk according to claim 1, wherein the trunk further comprises a locking mechanism to lock said at least one removable lid in its closed position and wherein said at least one removable lid has a lower edge and the locking mechanism comprises a latch receiving opening and a closing plate pivotably connected to said at least one removable lid, wherein the closing plate is movable to an opening position in which, when a latch is received in the latch receiving opening, said latch is maintained away from the lower edge of said at least one removable lid.

6. A trunk according to claim 1, wherein said hollow base comprises a peripheral edge having at least a drainage groove to prevent water from draining from said at least one removable lid inside the storage space when said at least one removable lid is in the closed position.

7. A trunk according to claim 1, wherein the hollow base comprises a first lateral portion, a second lateral portion and a central portion located between the first and second lateral portions, said at least one removable lid comprising first and second removable lids, cooperating respectively with the first and the second lateral portions of the hollow base, for opening or closing the first and second lateral portions of the hollow base.

8. A trunk according to claim 7, wherein the central portion of the hollow base has a back wall having an outer face, the outer face of the back wall having at least a drainage channel.

9. A trunk according to claim 7, configurable to have the first and second lateral portions of the hollow base communicate with each other via the central portion.

10. A trunk according to claim 9, further comprising a storage space splitter having a peripheral edge, wherein the hollow base comprises a separation groove, the peripheral edge of the storage space splitter cooperating with the separation groove to prevent water from flowing between the central portion and the first lateral portion.

11. A trunk according to claim 7, wherein the central portion has first and second opposed lateral walls comprising respectively first and second openings, the first and second lateral portions of the hollow base being in communication with each other via the first and second openings and the central portion.

12. A trunk configured to be mounted on an all-terrain vehicle, the trunk comprising at least:
    a hollow base mountable on the all-terrain vehicle and defining at least one storage space;
    at least one removable lid partially connectable to the hollow base, said at least one removable lid being movable, when connected to the hollow base, between a closed position in which said at least one storage space is covered, and an opened position for providing access to said at least one storage space;
    a dismantlable connector for connecting said at least one removable lid to the hollow base, the dismantlable connector being only dismantlable when said at least one removable lid is in its opened position; and
    a locking mechanism to lock said at least one removable lid in its closed position;
    wherein said at least one removable lid has a lower edge and the locking mechanism comprises a latch-receiving opening and a closing plate pivotably connected to said at least one removable lid, wherein the closing plate is movable to an opening position in which, when a latch is received in the latch-receiving opening, said latch is maintained away from the lower edge of said at least one removable lid.

13. A trunk according to claim 12, wherein the dismantlable connector is at least partially distinct from the hollow base and from said at least one removable lid.

14. A trunk according to claim 12, further comprising a blocking device preventing dismantling of the dismantlable connector when said at least one removable lid is in its closed position, said blocking device being hidden in said storage space when said at least one removable lid is in its closed position.

15. A trunk according to claim 14, wherein the hollow base comprises an upper edge and said at least one removable lid comprises a lower edge engageable with the upper edge of the hollow base, and wherein at least one of said upper and lower edges has a slot, the blocking device being partially received in said slot when said at least one removable lid is in its closed position.

16. A trunk according to claim 14, wherein the dismantlable connector comprises a hinge pin defining a first axis and has a first end, the blocking device being a portion of the dismantlable connector extending from the first end in a transverse direction relative to the first axis.

17. A trunk according to claim 12, wherein the dismantlable connector further comprises a dismantlable opening limiting device to retain the removable lid when in the opened position, the dismantlable opening limiting device selectively connecting said at least one removable lid with the hollow base, wherein the dismantlable opening limiting device is dismantlable only when said at least one removable lid is in its opened position.

18. A trunk according to claim 12, wherein the hollow base comprises first and second inner walls and the trunk further comprises at least one removable space divider removably mounted to said first and second inner walls, allowing to reconfigure said storage space and to define first and second space divisions, and wherein the hollow base has a bottom surface comprising a groove, the removable space divider having a lower portion cooperating with the groove of the bottom surface.

19. A trunk according to claim 12, wherein said hollow base comprises a peripheral edge having at least a drainage groove to prevent water from draining from said at least one removable lid inside the storage space when said at least one removable lid is in the closed position.

20. A trunk according to claim 12, wherein the hollow base comprises a first lateral portion, a second lateral portion and a central portion located between the first and second lateral portions, said at least one removable lid comprising first and second removable lids, cooperating respectively with the first and the second lateral portions of the hollow base, for opening or closing the first and second lateral portions of the hollow base, and wherein the central portion of the hollow base has a back wall having an outer face, the outer face of the back wall having at least a drainage channel.

21. A trunk according to claim 20, configurable to have the first and second lateral portions of the hollow base communicate with each other via the central portion.

22. A trunk according to claim 21, further comprising a storage space splitter having a peripheral edge, wherein the hollow base comprises a separation groove, the peripheral edge of the storage space splitter cooperating with the separation groove to prevent water from flowing between the central portion and the first lateral portion.

23. A trunk according to claim 20, wherein the central portion has first and second opposed lateral walls comprising respectively first and second openings, the first and second lateral portions of the hollow base being in communication with each other via the first and second openings and the central portion.

24. A trunk for an all-terrain vehicle, the trunk comprising:
a hollow base mountable on the all-terrain vehicle and defining at least one storage space;
at least one removable lid partially connectable to the hollow base, said at least one removable lid being movable, when connected to the hollow base, between a closed position in which said at least one storage space is covered, and an opened position for providing access to said at least one storage space;
said at least one removable lid being removably connected to the hollow base via a dismantlable hinge comprising a hinge pin selectively connecting a portion of said at least one removable lid with a portion of the hollow base, the dismantlable hinge being dismantlable when said at least one removable lid is in its opened position;
the trunk further comprising a blocking device preventing dismantling of the dismantlable hinge when said at least one removable lid is in its closed position;
wherein the hollow base comprises a first lateral portion, a second lateral portion and a central portion located between the first and second lateral portions, said at least one removable lid comprising first and second removable lids, cooperating respectively with the first and the second lateral portions of the hollow base, for opening or closing the first and second lateral portions of the hollow base.

25. A trunk according to claim 24, wherein the central portion of the hollow base has a back wall having an outer face, the outer face of the back wall having at least a drainage channel.

26. A trunk according to claim 24, configurable to have the first and second lateral portions of the hollow base communicate with each other via the central portion.

27. A trunk according to claim 26, further comprising a storage space splitter having a peripheral edge, wherein the hollow base comprises a separation groove, the peripheral edge of the storage space splitter cooperating with the separation groove to prevent water from flowing between the central portion and the first lateral portion.

28. A trunk according to claim 24, wherein the central portion has first and second opposed lateral walls comprising respectively first and second openings, the first and second lateral portions of the hollow base being in communication with each other via the first and second openings and the central portion.

29. A trunk according to claim 24, wherein the dismantlable hinge is at least partially distinct from the hollow base and from said at least one removable lid.

30. A trunk according to claim 24, wherein the hollow base comprises an upper edge and said at least one removable lid comprises a lower edge engageable with the upper edge of the hollow base, and wherein at least one of said upper and lower edges has a slot, the blocking device being partially received in said slot when said at least one removable lid is in its closed position.

31. A trunk according to claim 24, wherein the hinge pin defines a first axis and has a first end, the blocking device being a portion of the dismantlable hinge extending from the first end in a transverse direction relative to the first axis.

32. A trunk according to claim 24, wherein the trunk further comprises a locking mechanism to lock said at least one removable lid in its closed position and wherein said at least one removable lid has a lower edge and the locking mechanism comprises a latch receiving opening and a closing plate pivotably connected to said at least one removable lid, wherein the closing plate is movable to an opening position in which, when a latch is received in the latch receiving opening, said latch is maintained away from the lower edge of said at least one removable lid.

* * * * *